Sept. 22, 1970   S. GIORDANO   3,530,332
MULTI-PERIODIC ACCELERATING STRUCTURE
Filed May 20, 1969   5 Sheets-Sheet 1
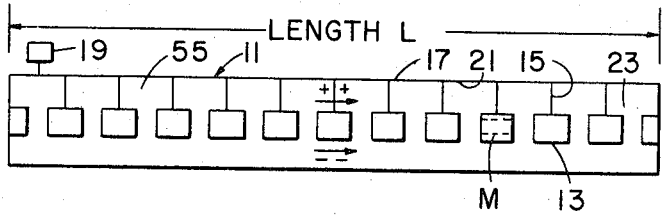
PRIOR ART  *Fig. 1*
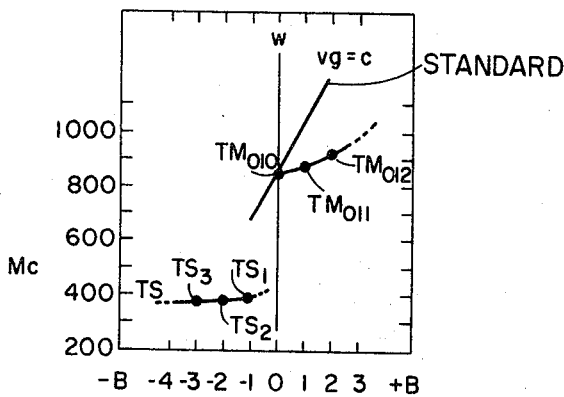
PRIOR ART *Fig. 2*
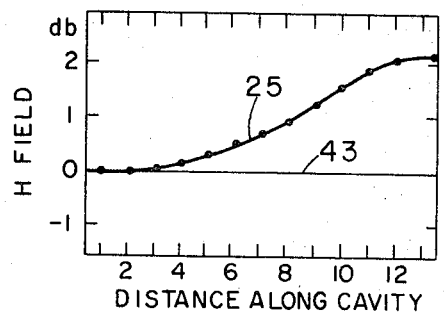
PRIOR ART *Fig. 3*
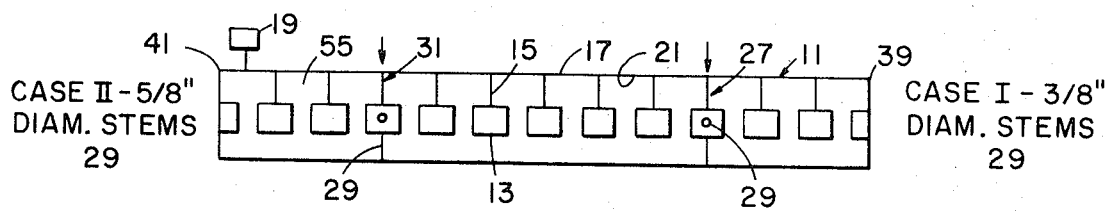
*Fig. 4*
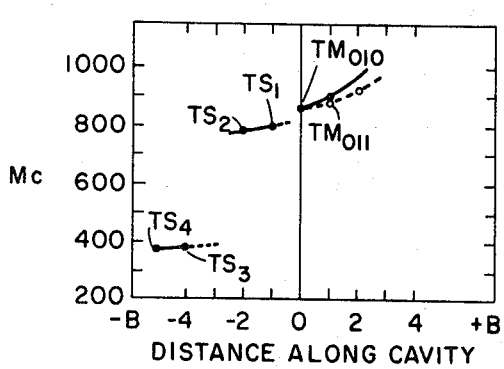
*Fig. 5*
INVENTOR.
SALVATORE GIORDANO
BY Sept. 22, 1970                    S. GIORDANO                    3,530,332
                    MULTI-PERIODIC ACCELERATING STRUCTURE
Filed May 20, 1969                                        5 Sheets-Sheet 2
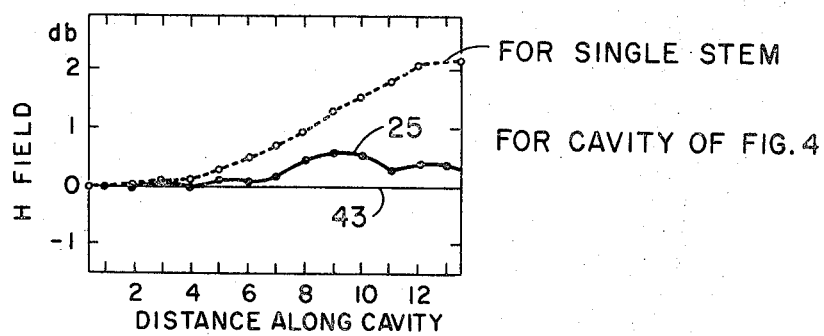
Fig. 6
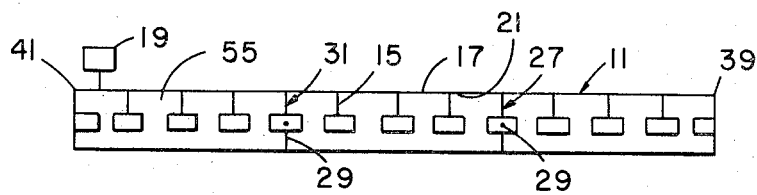
Fig. 7
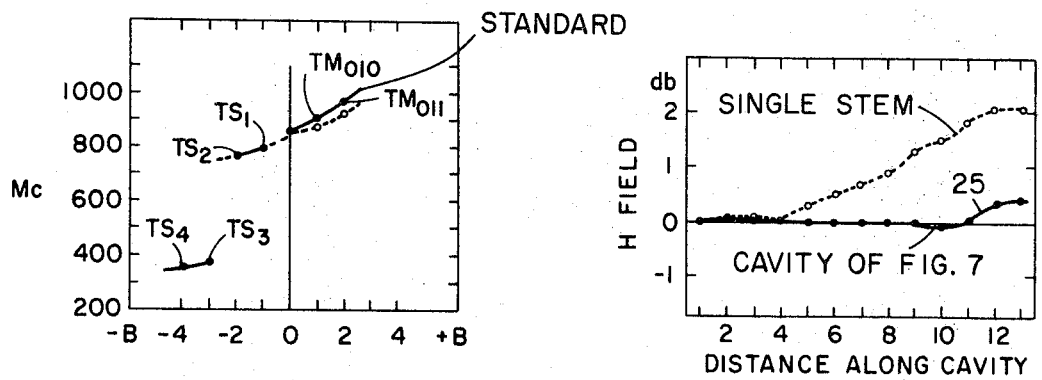
Fig. 8                                Fig. 9
INVENTOR.
SALVATORE GIORDANO
BY Sept. 22, 1970  S. GIORDANO  3,530,332
MULTI-PERIODIC ACCELERATING STRUCTURE
Filed May 20, 1969  5 Sheets-Sheet 3

INVENTOR.
SALVATORE GIORDANO

United States Patent Office 3,530,332
Patented Sept. 22, 1970

3,530,332
MULTI-PERIODIC ACCELERATING
STRUCTURE
Salvatore Giordano, Port Jefferson, N.Y., assignor to the
United States of America as represented by the United
States Atomic Energy Commission
Filed May 20, 1969, Ser. No. 826,098
Int. Cl. H01j 25/10
U.S. Cl. 315—5.41
10 Claims

ABSTRACT OF THE DISCLOSURE

Multi-periodic charged particle accelerator apparatus and method having a cylindrical, Alvarez-type, accelerator tank formed with a plurality of spaced-apart drift tubes supported therein by one supporting stem, and having multiple periodic tuning means at periodic, spaced apart intervals in said tank for producing transverse stem resonances for reducing detuning and beam loading effects, and providing tank stiffening that reduces field variation due to frequency perturbation, while reducing power consumption and mechanical complexity.

CROSS-REFERENCES TO RELATED APPLICATIONS

Pat. No. 3,466,554, issued Sept. 9, 1969, "Improved Accelerator Apparatus and Methods," assigned to the assignee of this application, by the inventor herein.

BACKGROUND OF THE INVENTION

Field of the invention

This invention relates to linear accelerators for accelerating charged particles, and more particularly to charged particle, linear accelerators having drift tubes supported by stems in Alvarez type linear accelerator tanks.

Description of the prior art

In high energy particle physics, it is desirable to accelerate a beam of charged particles along a longitudinally extending equilibrium axis, and various proposals have been made and used to accomplish such acceleration. One apparatus for accelerating protons for injection into the AGS at Brookhaven National Laboratory is described in "The Linear Accelerator for the AGS" reprinted in the 1960 International Convention Record by the inventor of this application. The linear accelerator apparatus (or linac) described in that publication, comprises a cylindrical, metal, standing wave resonating tank of the Alvarez type, and periodic drift tubes each supported in the tank by a single supporting stem.

In operation, an RF oscillator and amplifier are coupled to the tank to produce suitable resonances and fields therein. Since the ions take many periods of the RF fields to travel from one end of the tank to the other, the drift tubes are used to shield the ions from the fields while they are decelerative. To this end the drift tubes have suitable lengths and spacings corresponding to the velocity of the particles, whereby the ions take exactly a full period to pass from the entrance of one drift tube to the entrance of the next adjacent drift tube, whereby the ions are accelerated in the gaps between the drift tubes, and whereby the particles increase in velocity as they move through the tank.

While the above-described linear accelerator has been useful and can accomplish the desired acceleration, it has been extremely difficult or impossible to meet the close mechanical tolerances involved in achieving a uniform standing wave shape along the entire length of the resonating tank, and suitably to tune the tank for achieving high efficiencies. As a result, the resonating tanks known heretofore have had field variations along their length due to frequency perturbations therein, and these perturbations have been particularly troublesome due to the requirement that beam pulses must rapidly be introduced into the resonating tanks and pass therethrough. Accordingly, it has been advantageous to provide for tank stiffening for reducing the field variations due to the frequency perturbations and to improve the band width of the operating RF therein for reducing the detuning and adverse loading effects in the resonating tank due to the introduction and acceleration of the charged particles therein.

One structure and method for providing for tank stiffening and for reducing the detuning and adverse effects of the beam loading is described in the above cited Pat. 3,466,554 by the inventor of this application. In accordance with the invention of that application, the accelerator comprises a plurality of tanks wherein each drift tube in each tank after the first tank is supported by the same plural number of supporting stems more than one, whereby stem resonances (TS) provide suitable shaping of the fields in the linear accelerator tanks. These stem resonances are particularly significant due to the proximity of the TS modes and the conventional TM modes, which determine the operating properties of the linear accelerator structure. It was thus discovered, in accordance with the above cited copending application, that tank stiffening for reducing field variations due to frequency perturbations and a reduction in adverse detuning the beam loading effects was obtained by joining the TS and particular TM mode dispersion curves. However, the large number of stems involved in the invention of this above-mentioned copending application are more suitable for large peak current machines, due to the power consumption caused by the large number of supporting stems used therein. Also, it has been advantageous to provide improved tuning means while reducing the mechanical complexity in supporting the large numbers of stems, and to provide suitable means for continuous wave operation. Accordingly, as will be understood in more detail hereinafter, this invention is an improvement on the above-cited copending application, for producing stem resonances while reducing power consumption and mechanical complexities.

SUMMARY OF THE INVENTION

The invention described herein was made in the course of, or under a contract with the United States Atomic Energy Commission.

In accordance with this invention a particular Alvarez type, linear accelerator structure is provided having particular, multi-periodic, spaced-apart, selectively spaced, drift tube supporting stems, wherein individual drift tubes in individual linear accelerating tanks have multiple periodic transverse tuning means in a spaced apart, periodic arrangement. More particularly, in one embodiment, this invention comprises a standing wave linear accelerator having a plurality of single stem supported drift tubes in a linear accelerator resonance tank, and parallel multiple periodic transverse tuning means provided at suitable periodic intervals along the length of the tank. With the proper selection of components and their arrangement and spacing, as described in more detail hereinafter, this invention provides the desired improved accelerator structure and method.

The above and further novel features and objects of this invention will appear more fully from the following detailed description when the same is read in connection with the accompanying drawings. It is to be expressly understood, however, that the drawings are not intended

BRIEF DESCRIPTION OF THE DRAWINGS

In the drawings where like elements are referenced alike:

FIG. 1 is a partial cross-section through an Alvarez type linear accelerator having drift tubes that are each supported in a resonating tank shaped cavity by a single supporting stem;

FIG. 2 is a dispersion curve for the apparatus of FIG. 1, wherein as referred to hereinafter, the dispersion curve illustrates the resonant frequencies of the linear accelerator apparatus involved for various TS and $TM_{01}$ modes of operation, wherein the resonant frequency in mc./sec. is plotted against relative phase shift B.

FIG. 3 is a graphic illustration of the field tilt of the apparatus of FIG. 1, wherein, as referred to hereinafter, the field tilt is a plot of the change in the H field at the wall of the tank shaped cavity involved vs. the distance along the tank cavity due to perturbation therein, such as from beam loading, mechanical imperfections, and the like, so that a comparison can be made between an actual tank and a theoretically perfect tank of the same shape and dimensions wherein the H field along the whole distance of the tank cavity is zero;

FIG. 4 is a partial cross-section of one embodiment of this invention, showing multi-periodic tuning means, comprising two spaced apart tuning means, wherein each tuning means comprises four equally spaced supporting stems for spaced apart drift tubes of the apparatus of FIG. 1;

FIG. 5 is a graphic illustration of the dispersion curve for the apparatus of FIG. 4;

FIG. 6 is the graphic illustration of the field tilt of the apparatus of FIG. 4.

FIG. 7 is a partial cross-section of another embodiment of the apparatus of FIG. 4 having the spaced apart multi-periodic tuning means thereof moved closer together for improved coupling therebetween;

FIG. 8 is a graphic illustration of the dispersion curve of the apparatus of FIG. 7;

FIG 9 is a graphic illustration of the field tilt of the apparatus of FIG 7;

DESCRIPTION OF THE PREFERRED EMBODIMENT

It is known that beams of ions or heavier particles may be accelerated at various modes of field and frequency in an Alvarez type linear accelerator structure having drift tubes supported by stems in a cylindrical standing wave resonating tank. In this regard, the transverse-magnetic field pattern is designated by the symbol $TM_{01}$, in which case the phase velocity must always be greater than the velocity of light. On the other hand, the group velocity $V_g$, which is the velocity at which information or power can be propagated down the accelerator tank, must always be less than the velocity of light. Accordingly, it is advantageous to match the particle velocity with the phase velocity of the accelerating standing wave.

Figure 10:
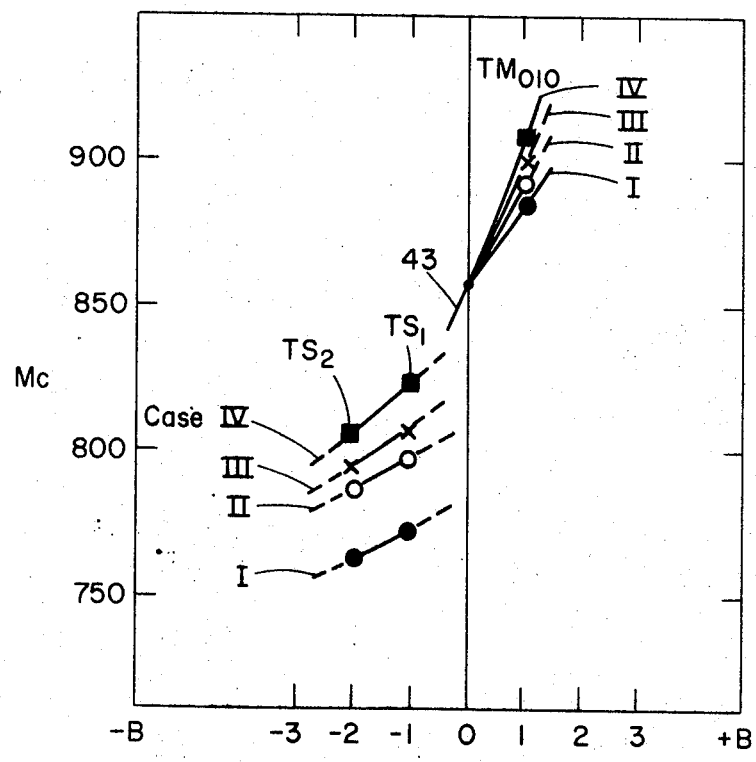
FIG. 10 is a graphic illustration of the dispersion curve of the apparatus of FIG. 4 and FIG. 11, showing the effect of various drift tube supporting stem diameters for the multi-periodic tuning means thereof.

In the special case of the $TM_{010}$ mode, the tanks operate at a given frequency to produce a given transverse-magnetic field pattern, or mode of field, wherein the phase velocity becomes infinite, as described on page 321 of "Particle Accelerators" by Livingston and Blewett, McGraw-Hill, 1962, as shown in FIG. 10–2(b) thereof. Such an Alvarez type linear accelerator with quadrupole focusing lenses in the drift tubes is shown and discussed by the inventor of this application in "The Linear Accelerator Injector For the AGS," which is reprinted in the 1960 International Convention Record, part 9. FIG. 7 of that paper illustrates a linear accelerator of this type wherein acceleration of the particles is based on the fact that all the particles making up a particular beam have approximately the same momentum, as is well known in the art. An accelerator of this type is employed in accordance with this invention, and to this end, as will be understood in more detail hereinafter, the accelerator of this invention is particularly adapted for use at low phase velocities and low frequencies for the acceleration of protons or heavier ions.

By operating the tanks at a frequency and field in the $TM_{010}$ mode, transverse stem resonances can be generated whose frequency alters the field about this $TM_{010}$ mode to provide low beam loading and detuning effects, and suitable shunt impedance at high particle densities and particle energies up to at least 150 mev. The TS pass band, which results from such transverse stem resonances, is described in the above cited copending application. Also, as described therein, each respective drift tube can have the same given number of stems in each tank for supporting the drift tubes. Thus, in one embodiment, the first tank can have one stem per drift tube, the next tank can have two stems per drift tube, the next tank can have three stems per drift tube, and so on, whereby the increasing number of stems increasingly moves up the TS resonance frequencies, as shown by the dispersion curve therefor, whereby the TS and TM dispersion curves meet.

It has now been discovered that by providing specific multi-periodic tuning means for specific drift tubes at particular periodic intervals along particular linear accelerator tanks, the power consumption and mechanical difficulties can be reduced while still providing field amplitude and phase stabilization, tank stiffening, and low detuning and beam loading effects. To this end in accordance with one embodiment of this invention, the multiperiodic tuning means form a plurality of elements that radiate in parallel planes normal to the accelerator axis and around specific points on the accelerator axis. For example, these tuning means are located at periodic, spaced-apart loci in each accelerator tank having a length $L_0$ so that the spacing between adjacent of the tuning means is a given distance, and the spacing between the end of the tank and the closest tuning means thereto is $n/2L_0$.

With the proper selection of tuning elements and their location, as described in more detail hereinafter, the desired improvements are achieved.

In understanding this invention, reference is made to

FIG. 1, which illustrates a 19 mev. model of an Alvarez type linear accelerator 11 having drift tubes 13 each supported by one ⅜" diameter stem 15 in a longitudinally extending, right circular cylindrical linear accelerator tank 17, wherein the tank 17 is operated in the $TM_{01}$ mode at a frequency of approximately 833 mc./sec. The drift tubes 13, tank 17 and RF energy source 19 are conventional, as described and shown in FIG. 1a of the above cited copending application. Also, as described in said above-cited copending application the drift tubes have quadrupole focusing magnets M therein.

FIGS. 2 and 3 herein, illustrate the dispersion curve for the described structure of FIG. 1, and the field tilt thereof, as measured along the inside wall 21 of the tank 17 for a perturbation placed in the end gap 23 thereof, as illustrated by the line 25 in FIG. 3. This perturbation may be placed in subsequent tanks and the corresponding field tilt may then be compared to a theoretical zero tilt for a single stem cavity, in which the drift tubes 13 are each supported by a single stem 15, as illustrated herein in FIG. 1. The improvement factor provided may be derived as defined by the reduction in field tilt.

Now consider the structure of FIG. 4 and measurements therefor illustrated by FIGS. 5 and 6, wherein two sets of tuning means 27, comprising four multiperiodic stems 29 radiate at equal distances from each other around the accelerator axis z—z at spaced apart points. Thus, the first and second sets 31 of four stems 29 are supported at loci in annular arrays that radiate around points 35 on the z—z axis of tank 17. These sets 31 of four stems 29 may be flared as shown in FIG. 10 of the above-cited copending application or uniform in diameter. In the embodiment shown in FIG. 4 herein, however, the stems are right circular, cylindrical stems with the third drift tube 13 from the opposite ends 39 and 41 of tank 17 being arranged in a multi-periodic four stem drift tube arrangement having four multi-periodic stems 29 of ⅝" diameter that support two individual, spaced apart drift tubes 13, while the other drift tubes are each formed with one stem 15 of ⅜" diameter. Thus, there are two one stem drift tubes 13 on the upstream side of the four stem drift tube, two one stem drift tubes 13 on the downstream side of the four stem drift tube and five one stem drift tubes 13 in between the four-stem drift tubes.

As illustrated in FIG. 5 the tuning means 27 increase the frequency of the first two modes of the TS dispersion curve of the apparatus of FIG. 4, when compared to the apparatus of FIG. 1, and there is a corresponding change in the $TM_{01}$ dispersion curve whereby the TS and TM dispersion curves tend to meet. Also, as illustrated in FIG. 6, the arrangement of FIG. 4 achieves a considerable improvement in the field tilt over the arrangement where each and every drift tube in tank 17 has only one stem 15. Moreover, it is a simple matter to increase the diameter of the stems 15 and/or 29 to achieve optimum tank flattening, whereby the field along the wall of tank 17 remains relatively constant from one end to the opposite end thereof even when there are perturbations or a beam causing loading in the tank 17.

Considering now FIG. 7, the structure thereof is similar to the structure of FIG. 4, except that the four stem drift tubes are located at $L_o/4$ in from the ends 39 and 41 of tank 17 in the arrangement of FIG. 4, whereas the four stem drift tubes of the arrangement of FIG. 7 are located at $L_o/3$ in from the ends 39 and 41 of the tank 17, the spacing between the center of each adjacent stem array of tuning means 27 being equal to $L_o$. From the shape of the dispersion curve illustrated in FIG. 8 for both the TS and TM modes of the structures of FIG. 7 it is seen that the $L_o/3$ structure of FIG. 7 has a larger bandwith than the $L_o/4$ structure of FIG. 4. Also, the field tilt of the structure of FIG. 7 is as good or better than the field tilt of the structure of FIG. 4.

The difference between the structures of FIGS. 4 and 7 can be explained with respect to the images one gets at the shortened ends 39 and 41 of the tank 17 in each respective case. In FIG. 4 the repeat length of the transverse multi-periodic TS tuning sets 31 is $L_o/4$, while in FIG. 7 the repeat length is $L_o/3$. In this regard, the structure of FIG. 7 has a compensation that is an improvement over the case where $L_o/2$ or $L_o/1$, since the apparatus of FIG. 7 is equivalent to having transverse multi-periodic TS tuning sets 31 at the normal shorting boundaries.

This shorting boundary configuration is also provided by changing the repeat length to $L_o/4$. In this case there is improvement in bandwidth, while retaining good compensation, as indicated by the flatness of the dispersion curve and its high slope, which will be understood from a dispersion curve that is ideally straight and has high slope, as shown by line 43 in the figures. Likewise, the apparatus of FIG. 7 has good compensation and field tilt, as illustrated by the joining of the TS and TM mode dispersion curves in FIG. 8, and the flat field tilt line 45 in FIG. 9. It will also be understood that both the $L_o/3$ and $L_o/4$ structures compare favorably in regard to compensation, field tilt and dispersion curve characteristics since both structures employ the same basic symmetry for their shorting boundaries but with the ends placed differently therein. Thus, both the tuning means 27 of this invention can be arranged symmetrically in tanks 17 having a wide variety of lengths and numbers of paired tuning means 27 therein.

Figure 11:
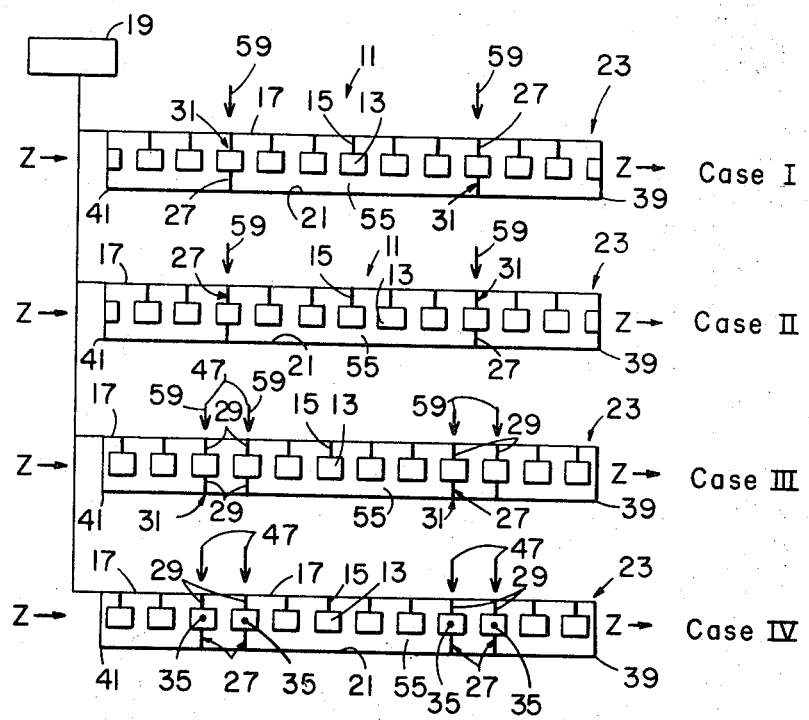
FIG. 11 is a partial cross-section of an Alvarez type linear accelerator having two sets of paired multi-periodic tuning means in accordance with this invention.
Figure 12:
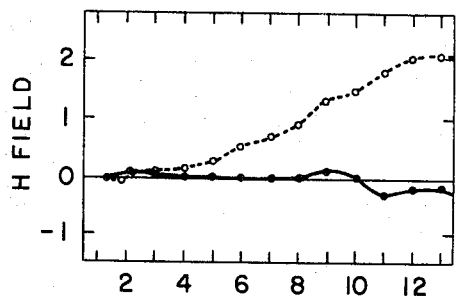
FIG. 12 is a graphic illustration of the field tilt of the apparatus of FIG. 11.

In FIG. 10 we see the effects of stem diameter changes. In this regard, one structure involved represented by cases I and II, has the above-described pair of four stem drift tubes of FIG. 4 along with the described one stem drift tubes 13 arranged therewith. FIG. 11, on the other hand, is the structure measured for cases III and IV of FIG. 10, and represents a fairly well compensated structure in which drift tubes 13 are supported in tank 17 by one stem 15 and the other drift tubes are supported by two pairs 47 of sets 31 of four equally spaced stems 29 forming two pairs 47 of adjacent multi-periodic tuning means 27. In both the structures of FIGS. 4 and 11, it is seen that increasing diameter stems raise the TS and TM resonance frequencies. The paired structure of FIG. 11, however, has improved coupling characteristics over those of the unpaired structures of FIGS. 4 and 7 while retaining the good features thereof as illustrated by the tank tilt characteristics thereof as shown in FIG. 12.

It should be pointed out in regard to the above-mentioned measurements for the paired structure of FIG. 11 that the additional stems 29, i.e., the use of two sets of two adjacent periodic, spaced apart, four stem drift tubes in combination with a plurality of one stem drift tubes, as shown in FIG. 11, introduces severe local perturbations. However, the effect of local perturbations is unimportant because the improvement in tank stiffening properties is such that no effort is necessary to correct for these local perturbations.

In the operation of one embodiment of this invention, e.g. case IV of FIG. 11, the spaced pairs of four stem drift tubes are supported by stems 29 at spaced-apart loci in tank 17 to generate transverse stem resonances of a frequency that alters the field about the $TM_{010}$ mode. The loci of the stems 29 of the four stem drift tubes are arranged in parallel planes at right angles to the z—z axis so that the stems 29 form an equally spaced annular array around center points 35 along the z—z axis. Also the loci of these stems 29 are located where the upper TM mode and the lower TS mode emerge. Additionally, the spacing between the adjacent sets of stems 29 for each of the four stem drift tubes is equal to a distance $L_o$, where the end of the tank 17 and the closest loci of any set of four stems is $n/2L_o$, where $n$ is neither 1 or 2.

Figure 13:
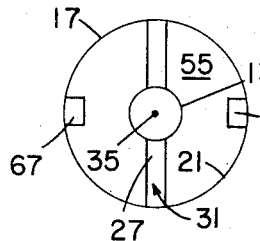
FIG. 13 is a partial cross-section of a multi-periodic tuning means having two equally spaced tuning screws and drift tube supporting stems in accordance with this invention for low energy particles.
Figure 14:
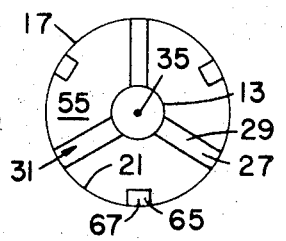
FIG. 14 is a partial cross-section of a multi-periodic tuning means having three equally spaced fine tuning screws and drift tube supporting stems in accordance with this invention for medium particle energies.
Figure 15:
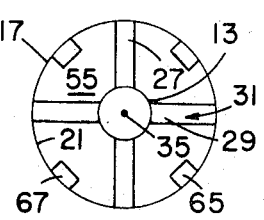
FIG. 15 is a partial cross-section of a multi-periodic tuning means having four equally spaced fine tuning screws and drift tube supporting stems in accordance with this invention for intermediate particle energies.
Figure 16:
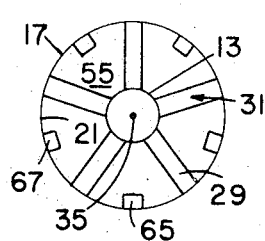
FIG. 16 is a partial cross-section of a multi-periodic tuning means having five equally spaced fine tuning screws and drift tube supporting stems in accordance with this invention for relatively high particle energies.

It will be understood from the above that the described combination of the multi-periodic transverse tuning means 27 of this invention can employ other than the described four stem combination. In this regard, at very low particle $\beta$'s, i.e. where $\beta = V/C = <1$ mev., e.g., up to about $.33c$ two stems 29 can be used, and at even higher energies and velocities three, four, five or more stems 29 can correspondingly be used in sets in each transverse tuning means 27 to provide the desired compensation, i.e., the desired tank stiffening and reduction in detuning and beam loading effects while reducing power consumption and mechanical difficulties in supporting the drift tubes. FIG. 13, illustrates a cross-section through tank 17 showing one multi-periodic drift tube 13 having a transverse tuning means 27, comprising two stems 29 in a tank 17 having a plurality of one stem drift tubes, and at least one more transverse tuning means 27, comprising another multi-stem drift tube. FIG. 14 illustrates a like cross-section showing three equally spaced stems 29 forming one transverse tuning means 27 for a drift tube. FIG. 15, illustrates a like cross-section showing a like four stem multi-drift tube, and FIG. 16, illustrates a like cross-section showing a five stem multi-periodic drift tube.

It is also understood that the tank 17 may have tuning means 27, comprising adjustable tuning screws 53 that thread through the wall 21 of tank 17 into cavity 55 to bisect the angle formed by the stems 29 supporting a multi-periodic drift tube in the plane of the stems 29. These screws 53 are illustrated in FIGS. 13–16. In operation these tuning screws 53 are screwed further and further into the cavity 55 to lower the frequency of the TS modes correspondingly and to adjust the cavity to an optimally flat tank tilt.

It is also understood that by using over-compensated multi-periodic stems 29 having slight larger diameters than necessary an over-compensated linac structure results having TS modes that are higher in frequency than is required for optimally flat tank tilt. This will be understood from the above and the figures which illustrate the upward movement in frequencies with increasing diameters of stems 29.

Figure 17:
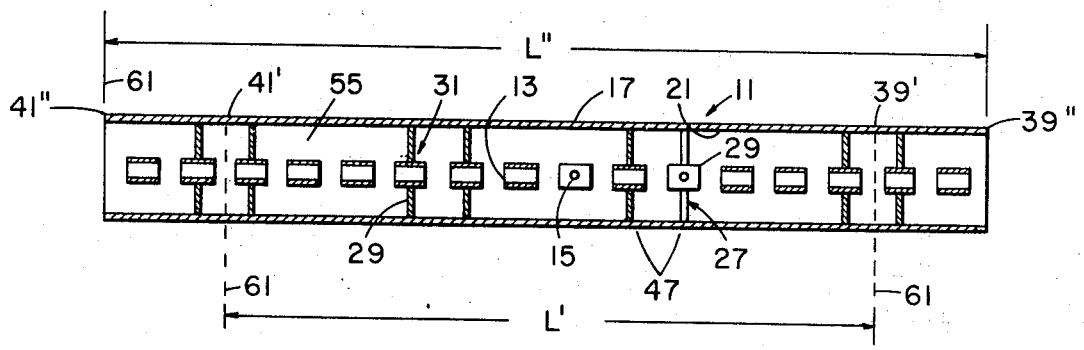
FIG. 17 is a partial cross-section of another embodiment of the paired multi-periodic tuning means of this invention.

Referring to FIG. 17 in another arrangement of the drift tubes and stems of this invention, the tank 17 is arranged in a symmetrical arrangement having a pair of adjacent sets of multi-periodic tuning means 27 spaced from other parts 47 of adjacent multi-periodic tuning means 27 in equal periods measured along the $z$—$z$ axis between the middle of pairs 47 of tuning means 27, with the ends of the tank 17 at the shortening boundaries between single stem drift tubes. It will be understood, however, that the ends of tank 17 can alternately be between end drift tubes having tuning means 27, as shown by dotted lines 61, since the shorting boundaries are also found at these locations. In this regard, the shorting boundaries are properly located at the ends of tank 17 when the ends of the tank correspond to the middle of or the end of the period formed by the spacing between the tuning means 27. Thus, the ends of the tank are located at the points where the mirror image of the tank can be formed.

In the operation of the embodiment shown in FIG. 17, the transverse multi-periodic tuning means 27, advantageously comprises four pairs 47 of sets 31 of four equally spaced stems 29 in parallel planes, wherein each set forms one tuning means 27. This arrangement is suitable for particle energies above about 1 mev. and produces a large bandwidth around the $TM_{01}$ operating mode, whereby when operated at 200 mc./sec., the tank 17 is 15 feet long. Moreover, having achieved a large bandwidth, it is possible to use only four pairs 47 of multi-periodic, transverse tuning devices 27, wherein the spacing about the $TM_{010}$ mode is greater than 2 mc./sec.

Advantageously, this tank 17 is used for accelerating charged particles downstream from at least one previous tank 17 having transverse, multi-periodic tuning means 27 therein, and upstream of at least one tank 17 having transverse, multi-periodic tuning means 27 therein. To this end, suitable charged particle and RF energy sources, such as the conventional RF energy and proton sources shown and described in the above-cited references and application, supply the necessary particles and RF accelerating energy for acceleration to 150 mev., for injection into a high energy linear accelerator, such as described in U.S. Pat. 3,403,346, by the inventor of the subject matter of this application, for further acceleration to energies above 150 mev., injection into a cyclic accelerator, such as the BNL AGS, or for impaction against a suitable target.

Figure 18:
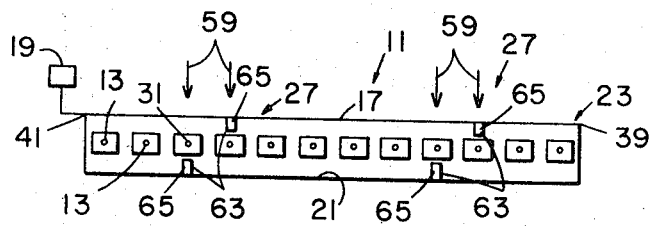
FIG. 18 is a partial cross-section of another embodiment of the paired multi-periodic tuning means of this invention.

In another embodiment shown in FIG. 18, the advantages of the described multi-periodic stems and tuning screws are provided by combining the functions of the tuning screws and stems 29 of the described apparatus in stubs 65. In this arrangement, the stubs 65 are adjustable inwardly and outwardly by screw threads 67 thereon for fine tuning and the stubs do not touch the single stem drift tubes 13 so as to increase power conservation. The single stem 15 for the drift tubes are directed parallel into the drift tubes at right angles to the plane of the paper of FIG. 18, and the stubs 67 provide the desired resonances for providing the desired merging of the TS and TM dispersion curves. Advantageously, the two adjacent stubs 67 form a pair 47 of multiple periodic tuning means 27 that are directed oppositely as shown in FIG. 18 for providing close coupling therebetween, and there are at least two pairs 47 of adjacent stubs 67 arranged in tank 17 to divide the tank 17 into symmetrical, equal length periods measured from the half way point on axis $z$—$z$ between two adjacent stubs 67 of one pair 47 of stubs 67 to the half way point on the $z$—$z$ axis between the next pair 42 of stubs 67.

This invention has the advantage of providing tank stiffening and reducing detuning and beam loading effects in an Alvarez type linear accelerator. Moreover, the multi-periodic tuning means of this invention has the advantage of reducing power consumption and mechanical fabrication problems. Accordingly, this invention is particularly advantageous for continuous wave operation.

What is claimed is:

1. In a linear accelerator for high energy charged particles having cylindrical cavity means forming an open ended tank extending longitudinally along an axis, a plurality of drift tubes, single stem means in parallel planes at right angles to the axis of said tank for supporting each drift tube in said tank, and means for producing resonance fields in said tank for accelerating said particles in the gaps between said drift tubes, the improvement comprising multi-periodic, spaced apart, transverse, tuning means in spaced apart of said planes having several of said drift tubes therebetween for producing transverse stem resonances in said tank whose frequency alters the field about the $TM_{01}$ mode to provide low beam loading and tank detuning effects, for providing high shunt impedance, and high power acceleration while minimizing mechanical complexity and power consumption.

2. The invention of claim 1, in which said multi-periodic, spaced-apart, transverse tuning means comprise at least one stem that interacts with said single stem means at the location of several of said drift tubes for producing said stem resonances.

3. The invention of claim 1, in which said transverse tuning means comprises stem means forming an equally spaced, annular array around said axis with spaced-apart of said single stem means for producing said stem resonances.

4. The invention of claim 1, in which said transverse tuning means are spaced from each other by a distance $L_0$, where the ends of said tank are at the shorting boundaries of the tank, and the distance between the tank ends and the closest transverse tuning means thereto is $n/2$ $L_0$, where $n$ is greater than 2.

5. The invention of claim 1, wherein said transverse tuning means form spaced apart paired tuners located on adjacent of said drift tubes for producing said resonances with good coupling between said paired tuners.

6. The invention of claim 1, wherein said transverse tuning means are formed by a combination of stems having diameters between 3/8″ and 5/8″ in diameter.

7. The invention of claim 1, wherein said transverse tuning means comprises stems and tuning screws that are arranged in said parallel planes in an annular array around said axis with equal spacing between said screws and stems, with said screws touching the inside wall of said tank, and with said stems touching the inside wall of said tank and the outside of respective of said drift tubes.

8. The invention of claim 1, in which said transverse tuning means comprise stubs extending in respective of said parallel planes a distance part way from the inside wall of said tank to respective of said drift tubes in a direction normal to said axis and at right angles to one of said respective of said single stem means.

9. The invention of claim 1 in which said transverse tuning means comprises stubs extending in adjacent pairs in adjacent of said parallel planes a distance part way from the inside wall of said tank to respective of said drift tubes in a direction normal to said axis, and at right angles to one of said respective of said single stem means so that said tubes are in a single plane coinciding with said axis.

10. The invention of claim 1, in which said tank has two drift tubes having single stems at the opposite ends thereof, and said transverse tuning means comprise additional stems on drift tubes disposed between two single stem drift tubes.

References Cited

UNITED STATES PATENTS 3,466,554    9/1969    Giordano    315—5.42 X
3,012,170    12/1961    Heil    315—5.41

HERMAN KARL SAALBACH, Primary Examiner

S. CHATMON, JR., Assistant Examiner

U.S. Cl. X.R.

313—63; 328—233; 315—5.41